United States Patent [19]

Reinke et al.

[11] Patent Number: 4,463,906
[45] Date of Patent: Aug. 7, 1984

[54] GUIDANCE SYSTEM FOR LATERAL MOVE IRRIGATION MACHINES

[75] Inventors: Richard F. Reinke; Ronald J. Coash, both of Thayer County, Nebr.

[73] Assignee: Reinke Manufacturing Co., Inc., Deshler, Nebr.

[21] Appl. No.: 421,477

[22] Filed: Sep. 22, 1982

[51] Int. Cl.³ .............................................. B05B 3/18
[52] U.S. Cl. .................................. 239/720; 239/711; 180/167
[58] Field of Search ............... 239/711, 181, 184, 720, 239/183; 180/167, 168; 340/684, 686

[56] References Cited

U.S. PATENT DOCUMENTS

| | | |
|---|---|---|
| 1,079,817 | 11/1919 | Williamson . |
| 1,321,350 | 11/1913 | Alvarez . |
| 2,628,863 | 2/1953 | Maggart .......................... 239/711 X |
| 2,744,785 | 5/1956 | Lundegreen . |
| 2,931,579 | 5/1960 | Ruddell . |
| 3,202,361 | 8/1965 | Kane . |
| 3,381,893 | 5/1968 | Smith et al. . |
| 3,394,729 | 7/1968 | Bower et al. . |
| 3,415,335 | 12/1968 | Wise . |
| 3,444,941 | 5/1969 | Purtell . |
| 3,498,314 | 3/1970 | Gheen . |
| 3,587,763 | 6/1971 | Kinkead .......................... 239/711 X |
| 3,592,220 | 7/1971 | Reinke . |
| 3,598,142 | 8/1971 | Neier . |
| 3,797,517 | 3/1974 | Kircher et al. . |
| 3,802,627 | 4/1974 | Seckler et al. . |
| 3,823,730 | 6/1974 | Sandstrom et al. . |
| 3,974,845 | 8/1976 | Indresaeter ...................... 239/711 X |
| 4,099,669 | 7/1978 | Cortopassi ....................... 239/711 X |

*Primary Examiner*—John J. Love
*Assistant Examiner*—Kevin Patrick Weldon
*Attorney, Agent, or Firm*—Kokjer, Kircher, Bradley, Wharton, Bowman & Johnson

[57] ABSTRACT

A guidance system for a lateral move irrigation machine of the type having an elongate boom mounted on a plurality of motor driven towers which drive the boom along the field in a straight line path. A plurality of check points in the field are established by a series of magnetic and metallic elements placed in rows along the path of travel of the towers. The towers carry gradiometers or proximity switches which are sensitive to the elements and which deactivate the drive motors of the towers when the check points are reached. When all of the towers have reached the check points, the boom is properly aligned, and override circuits then activate the drive motors to resume movement of the machine.

9 Claims, 2 Drawing Figures

GUIDANCE SYSTEM FOR LATERAL MOVE IRRIGATION MACHINES

BACKGROUND AND SUMMARY OF THE INVENTION

This invention relates in general to irrigation equipment and deals more specifically with a system for controlling the guidance of a lateral move irrigation machine.

Mobile irrigation systems having elevated booms are generally classified either as center pivot machines or lateral move machines which are also referred to as linear or in line machines. In the center pivot machine, an upright stand pipe at the pivot point of the system supplies water to an elevated boom carried on wheeled towers. The towers are driven by drive motors in a circular path centered at the stand pipe, and sprinklers spaced along the boom apply water to the field. The lateral move irrigation system likewise has an elevated boom carried on mobile towers. However, instead of moving in a circular path, the towers of the lateral move system are usually driven in a straight line path which is perpendicular to the irrigation boom.

Although both types of irrigation system have been widely used and have performed well for the most part, the lateral move machine has various advantages over the center pivot machine which make the lateral move machine more desirable in many situations. With the center pivot system, considerable difficulty is encountered in applying adequate quantities of water to the corner areas of the square or rectangular fields in which the equipment usually operates. Also, more water must be delivered to the outer end of the irrigation boom than to the portions near the pivot since the outer portions of the boom cover more surface area.

Lateral move irrigation systems avoid these problems but are faced with others which have proven difficult to overcome. Perhaps most notably, accurate guiding of the lateral move machine through the field has presented considerable difficulty. Alignment systems such as that shown in U.S. Pat. No. 3,608,826 have been used for both center pivot machines and for lateral move machines and have been generally effective in maintaining the irrigation boom in a straight condition. Nevertheless, such systems are plagued by the types of problems which arise in connection with all mechanical devices. For example, the reliability of mechanical alignment devices is lacking somewhat, particularly after the parts have become worn due to prolonged use and exposure to the elements. Existing alignment systems are also characterized by undue cost and complexity which adds significantly to the overall cost of the irrigation equipment.

Additionally, existing alignment systems function only to maintain the boom in a straight condition. In lateral move machines, the entire boom can turn such that its direction of movement is angled relative to the intended direction of travel. Since this can occur while the boom remains substantially straight, conventional alignment systems are not effective to steer the machine back on course. If the irrigation machine departs appreciably from its intended course, the effectiveness of the irrigation suffers and in some cases the machine can move outside of the field and possibly cause serious damage to fences and other structures, as well as to the irrigation machine.

Guidance systems which have been proposed in the past for lateral move machines typically operate to sense the angular relationship of a support tower with respect to a reference line, such as a buried wire, an above ground cable, a furrow in the field, or a row of stakes. Due to the great length of the irrigation machine, small deviations in the angle of the tower cause large displacements at the end of the machine. Consequently, for effective guidance control, these systems must be extremely sensitive to the tower angular displacement in order to prevent undue displacement at the ends of the machine, and such sensitivity is difficult to achieve in actual practice.

It is the primary object of the present invention to provide an improved system for accurately guiding a lateral move irrigation machine along the intended path of travel with the irrigation boom maintained in a straight condition.

Another object to the invention is to provide a guidance system of the character described which avoids the mechanical problems associated with systems that employ mechanical linkages and the like. In this respect, it is noteworthy that the guidance system relies on fixed check points and does not depend on mechanisms on the irrigation machine that can lose their adjustment and develop other mechanical problems.

A further object to the invention is to provide a guidance system of the character described wherein the boom position is checked at regular intervals. In accordance with the invention, a series of spaced apart rows of check points are established at preselected locations in the fields, and the path of movement of the boom is automatically corrected when the irrigation machine reaches each row of check points. It is another important feature of the invention that the rows of check points can be spaced apart as desired to permit the boom position to be checked and corrected at various locations in the field.

An additional object to the invention is to provide a guidance system of the character described in which the drive motors of the irrigation machine are automatically energized to resume normal movement of the machine each time its path of movement has been corrected.

Yet another object of the invention is to provide a guidance system of the character described which is well adapted for use with various types and sizes of lateral move irrigation machines.

A still further object of the invention is to provide a guidance system of the character described which is simple and economical to construct and reliable in operation.

Other and further objects of the invention, together with the features of novelty appurtenant thereto, will appear in the course of the following description.

DETAILED DESCRIPTION OF THE INVENTION

Figure 1:
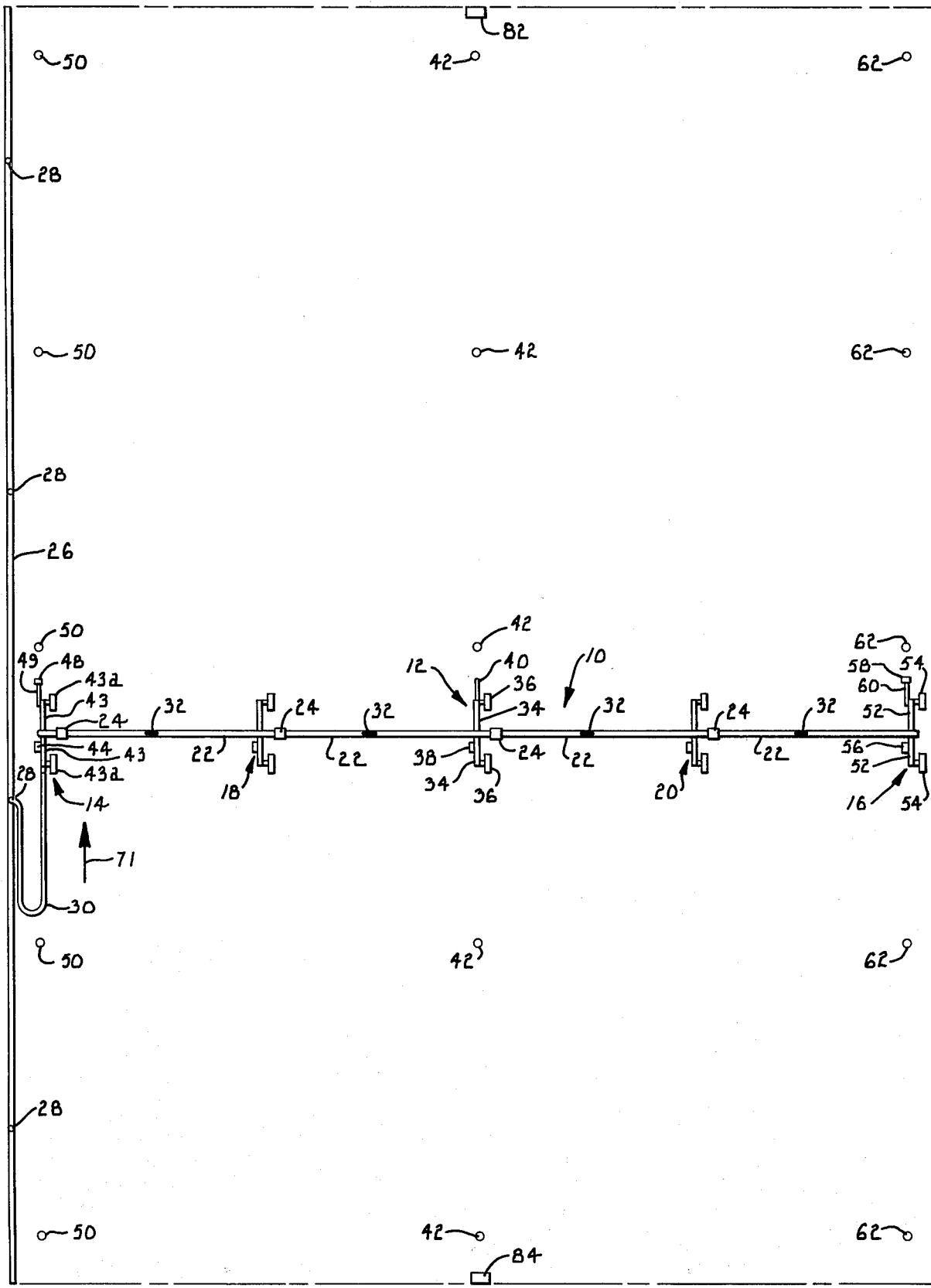
Figure 2:
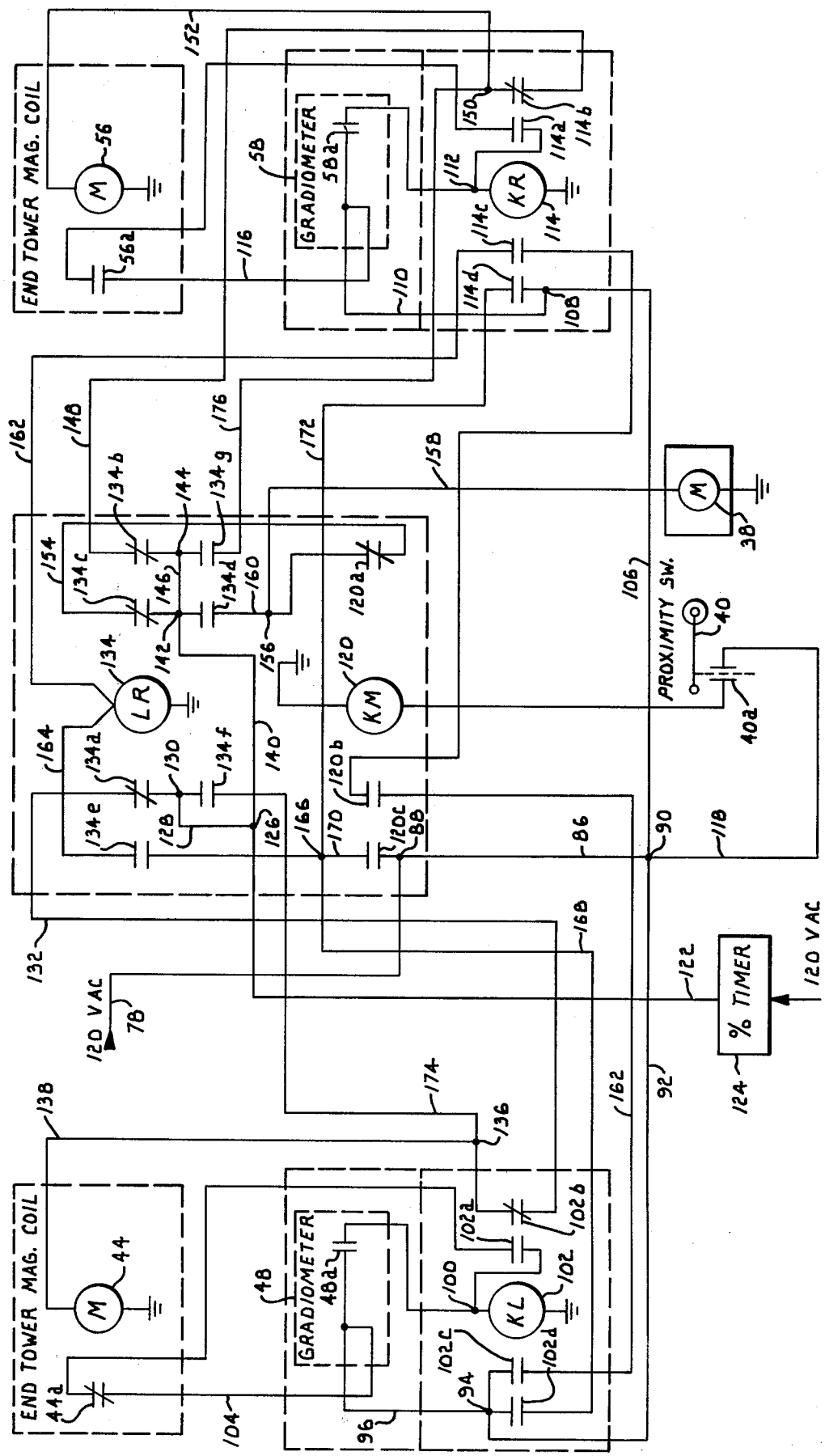

In the accompanying drawings which form a part of the specification and are to be read in conjunction therewith and in which like reference numerals are used to indicate like parts in the various views:

FIG. 1 is a top plan view of a lateral move irrigation machine which is equipped with a guidance system constructed in accordance with a preferred embodiment of the present invention; and FIG. 2 is a schematic diagram of the electrical control circuit included in the guidance system.

Referring now to the drawings in detail and initially to FIG. 1, reference numeral 10 generally designates an elongate elevated irrigation boom forming part of a lateral move irrigation machine. Boom 10 is carried on top of a plurality of spaced apart towers, including a central tower 12, an end tower 14, an opposite end tower 16, and intermediate towers 18 and 20 located between the center tower and the end towers. Boom 10 is formed by a plurality of elongate pipe sections 22 which are connected end to end by flexible couplings 24.

Water can be supplied to the irrigation boom 10 in any of a number of ways. In one type of water supply system, generally used on relatively short machines (up to about ¼ mile long), a supply pipe 26 extends along the ground at the side of the field to be irrigated and has a plurality of spaced apart outlets 28 to which one end of a flexible hose 30 may be connected. Hose 30 connects at its opposite end with one end of boom 10 to deliver water thereto. The boom includes a plurality of spaced apart sprinklers 32 which discharge water to the field in a uniform pattern of distribution. Water is pumped into supply pipe 26 by a conventional pump (not shown).

It should be understood that the guidance system of the present invention can be used on other types of linear irrigation machines such as those which move along the water supply pipe and automatically connect to it and disconnect from it at regular intervals along the length of the supply pipe. This type of machine is usually longer (approximately ½ mile) than the "hose drag" type of machine, and by reason of its greater length, conventional alignment systems and other types of guidance systems are not well suited for use with it. Accordingly, it is contemplated that longer machines can more advantageously employ the subject guidance system, although it can also be used with relatively short machines such as the "hose drag" arrangement shown in FIG. 1.

The irrigation boom 10 and each of the mobile towers are constructed in substantially the same manner as described in U.S. Pat. No. 3,608,826, to which reference may be made for a detailed understanding of the structure of the boom and towers. The center tower 12 has an "A" shaped frame which includes a pair of downwardly diverging legs 34 carrying ground engaging wheels 36 at their lower ends. A conventional electric motor 38 of the reversing type drives wheels 36 and may be reversed in order to propel tower 12 in opposite directions along the field. A proximity switch 40 extends from one of the tower legs 34 closely above the ground. As will be explained more fully, proximity switch 40 has normally open contacts which close when moved in proximity to any one of a series of metallic elements 42. The metallic elements 42 are spaced apart from one another in a straight line extending along the center of the field in order to establish check points at which the course of the boom is checked and corrected if necessary.

End tower 14 is constructed similarly, having downwardly diverging legs 43 carrying wheels 43a which are driven by a reversing electric motor 44. Tower 14 is equipped with a magnetic gradiometer 48 which is carried on an outwardly projecting arm 49 connected with one of the tower legs 43. The gradiometer 48 is located closely above the ground surface and is sensitive to magnets such as the magnets 50 which are spaced apart in the field in a straight line extending along the path of movement of tower 14. The opposite end tower 16 similarly has a pair of downwardly diverging legs 52, a pair of ground engaging wheels 54, and a reversing type electric motor 56 which drives the wheels. A magnetic gradiometer 58 is carried on a projecting arm 60 closely above the ground surface The gradiometer 58 is sensitive to magnets such as magnets 62 which are arranged in the field in a straight line extending along the intended path of movement of tower 16 and parallel to magnets 50 and the metallic elements 42.

The intermediate towers 18 and 20 are constructed in substantially the same manner as the remaining towers. A conventional alignment system (not shown) such as that shown in the above identified U.S. Pat. No. 3,608,826 serves to prevent tower 18 from moving unduly ahead of or lagging behind towers 12 and 14, and to prevent tower 20 from moving ahead of or lagging behind towers 12 and 16. The boom 10 is thus maintained in a straight condition at all times by the conventional alignment system. Additional support towers may be provided for longer irrigation booms, and a lesser number of towers is also possible. It should be understood that other types of alignment systems can be used, and that is some cases no alignment system is necessary (such as when each tower is controlled by the check point system of this invention).

In accordance with the present invention, the proximity switches 40 and the magnetic gradiometers 48 and 58 form part of a guidance system that serves to steer the boom such that it moves through the field in the intended direction of travel with the boom axis perpendicular to its direction of movement. Each row formed by one of the metallic elements 42, one magnet 50 and one magnet 62 is arranged in a straight line extending perpendicular to the intended direction of travel of the boom. The spacing between each adjacent pair of metallic elements and each adjacent pair of magnets is preferably the same. It should be pointed out that instead of three rows of check points, two rows can be provided (usually for relatively short machines), or more than three rows can be provided (usually for relatively long machines).

Referring now to FIG. 2, the guidance system includes an electrical control circuit having a conductor 78 to which 120 volt AC power is applied. Conductor 78 connects with another conductor 86 which extends between a pair of nodes 88 and 90. A conductor 92 extends between node 90 and another node 94 which connects with line 96. Line 96 extends through a set of gradiometer contacts 48a which are normally open but which close when gradiometer 48 is moved in proximity to one of the magnets 50. Line 96 extends through gradiometer 48 to a node 100. A relay coil 102 is connected between node 100 and ground. A conductor 104 connects at one end with line 96 and at the opposite end with node 100 in order to bypass the gradiometer contacts 48a. Line 104 includes a set of normally closed contacts 44a which open when the drive motor 44 of tower 14 is energized. Line 104 also includes a set of relay contacts 102a which are normally open but which close when relay coil 102 is energized.

Extending from node 90 in a direction opposite line 92 is a conductor 106 which leads to a node 108. A conductor 110 extends from node 108 through the gradiometer 58 of tower 16. Line 110 includes a set of normally open contacts 58a which close when gradiometer 58 is moved in proximity to one of the magnets 62. Line 110 leads to a node 112, and a relay coil 114 is connected between node 112 and ground. A conductor 116 connects at one end with line 110 and at the opposite end with node 112 in order to bypass the gradiometer contacts 58a. Line 116 includes a set of normally closed contacts 56a which open when the drive motor 56 of tower 16 is energized. Line 116 also includes a set of normally open relay contacts 114a which close when coil 114 is energized.

The proximity switch 40 controls a set of normally open contacts 40a which are included in a conductor 118 extending from node 90. Line 118 extends to ground through a relay coil 120. The normally open contacts 40a close when proximity switch 40 is moved adjacent one of the metallic elements 42.

The drive motors for towers 12, 14 and 16 are energized in normal operation of the irrigation machine by 120 volt power supplied to a conductor 122 through a percentage timer 124. The percentage timer is a conventional device which controls the time of operation of the drive motors. For example, if the percentage timer has a one minute cycle, it can be set such that the circuit through it is completed for the first 30 seconds and broken for the next 30 seconds of each one minute cycle. As a result, the irrigation machine is driven for 30 seconds, stopped for the next 30 seconds, driven for the next 30 seconds and so on. The cycle length can be varied, as can the percentage of time the machine operates during each cycle.

Line 122 leads from percentage timer 124 to a node 126, and another line 128 leads from node 126 to another node 130. Extending from node 130 is a condutor 132 having a set of normally closed relay contacts 134a which open when a relay coil 134 is energized. Line 132 has another set of normally closed relay contacts 102b which open when relay coil 102 is energized. Line 132 leads to a node 136, and another conductor 138 leads from node 136 and through motor 44 to ground to complete the circuit which activates motor 44 in normal operation of the irrigation machine.

Motor 56 is energized in normal operation by a circuit that includes a conductor 140 leading from node 126 to another node 142. Node 142 is connected with another node 144 by a conductor 146. A conductor 148 extends from node 144 and includes a set of normally closed relay contacts 134b which open when relay coil 134 is energized. Line 148 extends to a node 150 through a set of normally closed relay contacts 114b which open upon energization of relay coil 114. A conductor 152 extends from node 150 and through motor 56 to ground.

The circuit which energizes motor 38 in normal operation includes a conductor 154 which extends from node 142 and includes a set of normally closed relay contacts 134c that open when coil 134 is energized. Line 154 extends to a node 156 through another set of normally closed relay contacts 120a that open when relay coil 120 is energized. A conductor 158 extends from node 156 to ground through the drive motor 38 of the center tower. Extending between nodes 142 and 156 is a conductor 160 having a set of normally open relay contacts 134d that close when coil 134 is energized.

Energization of relay coil 134 is effected by a circuit that includes a conductor 162 extending from node 94. Conductor 162 includes a set of normally open relay contacts 102c that close when coil 102 is energized, another set of normally open relay contacts 120b that close when coil 120 is energized, and a third set of normally open relay contacts 114c that close when coil 114 is energized.

Coil 134 is connected with line 162 and with ground. Coil 134 also connects with a conductor 164 having a set of normally open relay contacts 134e that close when coil 134 is energized. Line 164 leads to a node 166. Extending between nodes 94 and 166 is a conductor 168 having a set of normally open relay contacts 102d that close when coil 102 is energized. Extending between nodes 88 and 166 is a conductor 170 having a set of normally open relay contacts 120c that close when coil 120 is energized. Another conductor 172 extends between nodes 108 and 166 and includes a set of normally open relay contacts 114d that close upon energization of coil 114.

Relay coil 134 has two additional sets of normally open contacts 134f and 134g that close when coil 134 is energized. Contacts 134f are included in a conductor 174 extending between nodes 130 and 136. Contacts 134g are included in a conductor 176 that extends between nodes 144 and 150.

In operation, the drive motors for the mobile towers 12, 14, and 16 are energized under the control the percentage timer 124 to propel the irrigation machine along the field in the forward direction indicated by the directional arrow 71 in FIG. 1. Boom 10 travels in a straight line path with the boom oriented perpendicular to its direction of movement through the field. Water is supplied to boom 10 from pipe 26 through hose 30 (or by means of another water supply system), and the water is discharged to the field from the sprinklers 32 as the boom is driven through the field. When the circuit through the percentage timer 124 is completed, power is supplied to motor 44 along the circuit provided by line 122, line 128, line 132 through the normally closed contacts 134a and 102b, and line 138. Power is supplied to energize motor 56 along the circuit formed by line 122, line 140, line 146, line 148 through the normally closed contacts 134b and 114b, and line 152. Power to motor 38 is supplied on line 122, line 140, line 154 through the normally closed contacts 134c and 120a, and along line 158 to motor 38. Drive motors 38, 44, and 56 are thus energized under control of the percentage timer 124 to propel the irrigation machine through the field in normal operation.

Boom 10 is stopped and its direction of movement is checked and corrected each time it reaches a position defined by the check points established by a row consisting of one metallic element 42, one magnet 50 and one magnet 62. When the left end tower 14 reaches one of the magnets 50, gradiometer 48 senses the magnet and closes its normally open contacts 48a. As a result, a circuit through relay coil 102 is completed along the path provided by line 78, line 86, line 92, line 96, contacts 48a, and node 100 to coil 102. Energization of the coil opens the normally closed contacts 102b and thus interrupts line 132 to break the circuit which normally energizes motor 44. Motor 44 is then deenergized to stop the movement of tower 14. Energization of coil 102 and deenergization of motor 44 are accompanied by closing of contacts 102a and 44a in order to complete a holding circuit from line 96 along line 104 to node 100 and coil 102. The holding circuit maintains coil 102 in the energized condition so long as motor 44 remains deenergized to hold contacts 44a in the closed position.

Drive motor 56 of the right tower 16 is deenergized in much the same manner when its gradiometer 58 encounters one of the magnets 62. The gradiometer contacts 58a then close to energize relay coil 114 along a path defined by line 78, line 86, line 106, line 110, and through contacts 58a to node 112 and coil 114. Energization of the coil causes contacts 114b to open, thus interrupting line 148 and breaking the circuit which normally maintains motor 56 in the energized condition. Coil 114 is thereafter maintained in the energized condition by a holding circuit which extends from line 110 along line 116 and through contacts 56a and 114a to node 112 and coil 114.

When the proximity switch 40 associated with the center tower 12 encounters one of the metallic elements 42, its contacts 40a are closed to complete a circuit extending along line 78, line 86, line 118, and through contacts 40a to relay coil 120. The relay contacts 120a then open to interrupt line 154 and thereby break the circuit which previously energized motor 38.

In this manner, the drive motors 38, 44 and 56 are all deenergized when the check points established by the metallic elements and magnets are reached. The remaining towers 18 and 20, as well as any other towers that may be included in the machine, are maintained on a straight line extending from the center tower to the end towers by the conventional alignment system (not shown). Alternatively, all of the towers may be provided with sensors similar to the gradiometers or proximity switches, along with a line of magnets or metallic elements spaced along the intended path of movement of the tower.

Since the check point or station defined by each row of one metallic element 32, one magnet 50, and one magnet 62 defines a straight line extending perpendicular to the intended direction of movement of the machine and the machine is stopped when it reaches each check point, the machine is positioned to travel in the intended direction of movement each time one of the check points is reached.

Operation of the machine resumes automatically after all of the towers have reached their check point stations. Relay coil 134 is energized when this occurs since relay contacts 102c, 120b and 114c are all closed due to energization of their relay coils. This completes a circuit path extending from node 94 along line 162 to coil 134. Energization of coil 134 completes an override circuit for each drive motor which activates the motor even though relay coils 102, 114, and 120 remain energized. The override circuit for motor 44 is completed along line 122, line 128, line 174 through the closed contacts 134f, and along line 138 to motor 44. Motor 44 is then energized to begin driving tower 14 away from the magnet 50. When motor 44 is energized, contacts 44a are opened to break the holding circuit for coil 102 which is then deenergized once the gradiometer 48 has moved away from the magnetic such that its contacts 48a open.

The override circuit for motor 56 is completed along line 122, line 140, line 146, line 176 through the closed contacts 134g, and along line 152 to motor 56. Motor 56 is then energized to drive tower 16, and contacts 56a open to break the holding circuit for coil 114. Coil 114 is thus deenergized when gradiometer contacts 58a open due to movement of tower 16 away from the magnet 62.

When relay coil 134 is energized, the override circuit for motor 38 is completed along line 122, line 140, line 160 through the closed contacts 134d, and along line 158 to motor 38. Motor 38 is thus energized to drive tower 12 even though coil 120 remains energized. Coil 120 is deenergized once tower 12 has moved far enough away from he metallic element 42 to open the contacts 40a of proximity switch 40. When coil 134 is energized, the circuits which activate the drive motors in normal operation of the machine can not be completed because contacts 134a, 134b and 134c remain open.

The override circuits remain completed and the circuits which normally activate the drive motors remain broken so long as relay coil 134 remains energized. Coil 134 has a holding circuit which maintains it in the energized condition so long as at least one of the coils 102, 114 and 120 remains energized. When coil 102 is energized, the circuit path to coil 134 is completed along line 78, line 86, line 92, line 168 through the closed contacts 102d, and along line 164 to coil 134 through the closed contacts 134e. When coil 114 is energized, a holding circuit to coil 134 is completed along line 78, line 86, line 106, line 172 through the closed contacts 114d, and along line 164 to coil 134 through the closed contacts 134e. When coil 120 is energized, the holding circuit to coil 134 is completed along line 78, line 170 through the closed contacts 120c and along line 164 to coil 134 through the closed contacts 134e. It is thus apparent that once it is energized, relay coil 134 remains energized so long as any one of the coils 102, 114 and 120 remains energized. Consequently, the override circuits for the drive motors remain completed and the circuits which normally energize the drive motors remain broken until such time as all of the coils 102, 114, and 120 have been deenergized. This assures that all of the towers are moved away from the metallic elements 42 and magnets 50 and 62 before normal operation of the irrigation machines resumes.

Once all of the coils 102, 114 and 120 have been deenergized, coil 134 is deenergized to interrupt the override circuits. This effects closing of contacts 134a, 134b and 134c to complete the circuits which energize motors 44, 56 and 38 in normal operation of the machine. The irrigation machine then operates normally until the next set of check points is reached, at which time the boom is again stopped and corrected in its course, if necessary, before further movement through the field resumes.

The successive rows of metallic elements and magnets extend perpendicular to the intended direction of movement of the boom, and the rows may be spaced apart in any desired pattern. The metallic elements and magnets may be replaced by alternative members such as stakes or other fixed structures located in the field at positions to actuate suitable switches when the towers arrive at the check points. In addition to such mechanical trip devices, photocells and other types of sensors can be used. Other types of circuits can be used and the actual circuitry employed depends upon a number of factors such as the number of towers controlled by check points.

It should be understood that only two towers controlled by check points are necessary for the guidance system to operate effectively. With longer irrigation machines, it is generally desirable to control more towers with check points, and all towers can be so controlled in some cases (an alignment system is then not needed). In contrast to guidance system which sense the angular deviation of a support tower relative to a reference line, the subject guidance system has check points at the extremes of the machine to eliminate significant deviations at the ends, thereby achieving more accuracy in guidance control, particularly with relatively long machines.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. In an irrigation machine having a plurality of mobile support units spaced apart from one another, an elongate irrigation boom mounted on said support units at an elevated position above the field to be irrigated, means for supplying water to said boom, a plurality of outlets spaced along the boom for applying water to the field, and drive means for each support unit for driving same through the field, a guidance system for the boom comprising:
   means for normally activating the drive means for each support unit to drive the irrigation boom through the field;
   means establishing a check point in the field for at least two selected support units, said check points being spaced apart in the field to define a substantially straight line extending generally perpendicular to the intended direction of travel of the boom when the boom crosses the check points;
   means for deactivating the drive means for said selected support units when each of the selected support units reaches its check point, whereby the boom extends generally along the substantially straight line defined by the check points when the check points have been reached; and
   override means for overriding said deactivating means in a manner to effect activation of the drive means for said selected support units when all of the selected support units have reached their check points.

2. The invention set forth in claim 1, wherein:
   said drive means for each selected support unit comprises an electrically controlled motor for each selected unit;
   said activating means comprises a normally closed electric circuit for each selected support unit leading to the motor thereof to activate the motor when the circuit is closed;
   said deactivating means comprises a normally closed switch in each circuit, each switch opening to open the corresponding circuit when the support unit corresponding to the switch reaches it check point, whereby each motor is deactivated when the corresponding check point is reached; and
   said override means comprises a normally open override circuit for each selected support unit leading to the motor thereof to activate the motor when the override circuit is closed, and switch means for closing each override circuit when all of the selected support units have reached their check points.

3. The invention set forth in claim 2, including means for opening each override circuit and closing each normally closed circuit after all of the motors have been activated by said override circuits.

4. The invention set forth in claim 2, wherein said switch means includes a normally deenergized relay which maintains each override circuit open in the deenergized condition and which closes each override circuit when energized, and means for energizing said relay when all of the selected support units have reached their check points.

5. The invention set forth in claim 4, including:
   means for deenergizing said relay after all of the motors have been activated by said override circuits; and
   means for closing each normally closed electric circuit after all of the motors have been activated by said override circuits.

6. The invention set forth in claim 1, wherein:
   each check point is provided by a detectable element located in the field; and
   said deactivating means comprises a plurality of sensors carried on the respective support units, said sensors being operable to detect said detectable elements when moved in proximity thereto and to deactivate the drive means of the corresponding support unit when said elements are detected.

7. The invention set forth in claim 1, wherein:
   said drive means for each selected support unit comprises an electrically controlled motor for each unit;
   said activating means comprises a normally closed circuit for each support unit leading to the motor thereof to activate the motor when the circuit is closed;
   said deactivating means comprises a normally closed switch in each circuit and a normally deenergized relay for each switch operable to open the switch when the relay is energized, each relay being energized when the corresponding check point is reached to thereby deactivate the corresponding motor; and
   said override means comprises a normally open override circuit for each selected support unit leading to the motor thereof to activate the motor when the override circuit is closed, and switch means for closing each override circuit when all of said relays are energized.

8. The invention set forth in claim 7, including means for deenergizing each relay to close said normally closed switch after the motor of the corresponding support unit has been activated by the override circuit to move the support unit away from its check point, and means for opening each override circuit after all of the relays have been deenergized.

9. The invention set forth in claim 8, including means for maintaining each override circuit closed until all of the relays have been deenergized.

* * * * *